United States Patent [19]

Hall et al.

[11] Patent Number: 5,046,130
[45] Date of Patent: Sep. 3, 1991

[54] MULTIPLE COMMUNICATION PATH COMPATIBLE AUTOMATIC VEHICLE LOCATION UNIT

[75] Inventors: Scott M. Hall, Fort Worth, Tex.; Thomas R. Berger, Crystal Lake, Ill.

[73] Assignee: Motorola, Inc., Schaumburg, Ill.

[21] Appl. No.: 391,204

[22] Filed: Aug. 8, 1989

[51] Int. Cl.$^5$ .............................................. H04B 1/44
[52] U.S. Cl. ........................................ 455/78; 455/83; 455/54
[58] Field of Search ...................... 455/78, 82, 83, 54, 455/56; 340/945, 961, 988; 342/457

[56] References Cited

U.S. PATENT DOCUMENTS

| 4,276,651 | 6/1981 | Bench et al. | 375/120 |
| 4,845,504 | 7/1989 | Roberts et al. | 455/54 |

Primary Examiner—Reinhard J. Eisenzopf
Assistant Examiner—Edward Urban
Attorney, Agent, or Firm—Steven G. Parmelee

[57] ABSTRACT

A location reporting device for use with both voice and data RF transceivers. The location determining device selects which of the transceivers will be utilized to transmit location information to a central site in response to a number of predetermined criteria, including reception of a polling request on one of the transceivers, initiation of transmission activity on one of the transceivers, and elapsed time since a last transmission of location information by the location unit.

8 Claims, 2 Drawing Sheets

MULTIPLE COMMUNICATION PATH COMPATIBLE AUTOMATIC VEHICLE LOCATION UNIT

TECHNICAL FIELD

This invention relates generally to automatic vehicle location, and particularly to communication of such location information to a base site.

BACKGROUND ART

Automatic vehicle location (AVL) devices are known in the art. Typically, an AVL unit operates to determine the position of a vehicle using dead reckoning techniques, Loran C monitoring, or monitoring of telemetry information as provided by global positioning system satellites. With such information, AVL units are able to at least approximately determine the geographic position of the unit itself, and hence an associated monitored object, such as a vehicle.

Often, it is desired to transmit this derived location information to a remote base site. For example, the AVL unit may be installed in a delivery truck, and the location information is preferably communicated to a delivery dispatcher who will make appropriate use of the location information. To accommodate this, prior art AVL units are typically operably connected to a radio transceiver that communicates on a voice resource or a data resource. (Many voice resources support data messages as well, such as resource assignment information, status message updates, and the like. As used herein, however, "voice resource" is intended to refer to a communication resource that is primarily intended for voice messaging, but which may also support short data messages of the type just referred to. "Data resource," on the other hand, is intended to refer to a data message only system, or substantially data only, wherein the data messages are not related to system protocol but rather are intended to convey system-independent information between two or more users.)

In prior art systems, the AVL user must select either a voice transceiver or a data transceiver to communicate the location information developed by the AVL unit. This remains so even if the vehicle to be monitored includes both a voice transceiver and a data transceiver. Voice resources and data resources, however, have different advantages and disadvantages, including traffic limitations, range, accessibility, and the like. A need exists for an AVL unit that can obtain the benefits of both voice transceivers and data transceivers when they are available.

SUMMARY OF THE INVENTION

This need and others is substantially met through provision of the dual communication path compatible AVL unit disclosed herein. The described AVL unit is compatible with both a voice resource communication unit and a data resource communication unit, wherein both communicating units are capable of communicating location information from the AVL unit to a reporting site. such as a base AVL site. The AVL unit itself includes a location determining unit for determining at least an approximate geographic location of the device, and a control unit. The control unit automatically causes the location of the device to be communicated to the reporting site by only one of the voice resource and data resource communication units, as a function of at least one predetermined criteria.

In one embodiment, when the radio operator asserts a push-to-talk (PTT) instruction on a voice resource, the AVL unit automatically provides for location information to be transmitted with the user's voice message as a preamble or postamble on the voice resource, unless the voice resource currently selected by the user constitutes a non-location update resource.

In a similar manner, if the user transmits a data message, such as a status message, using a data transceiver on a data communication resource, the AVL unit causes location data to be appended to the data message.

In another embodiment, when a location polling request is received from the base site, the AVL unit causes a responsive location data message to be transmitted over which ever of the resources (voice or data) supported the polling request.

In one embodiment, the AVL unit will cause a location data message to be transmitted to the site whenever a sufficient amount of time has passed since a location message was last transmitted, in order to ensure that location information at the base site remains current and relatively accurate. The AVL unit will cause this time triggered location message to be transmitted on a data resource, if one is available. Otherwise, the AVL unit will cause the data message to be transmitted over the voice resource.

BEST MODE FOR CARRYING OUT THE INVENTION

Figure 1:
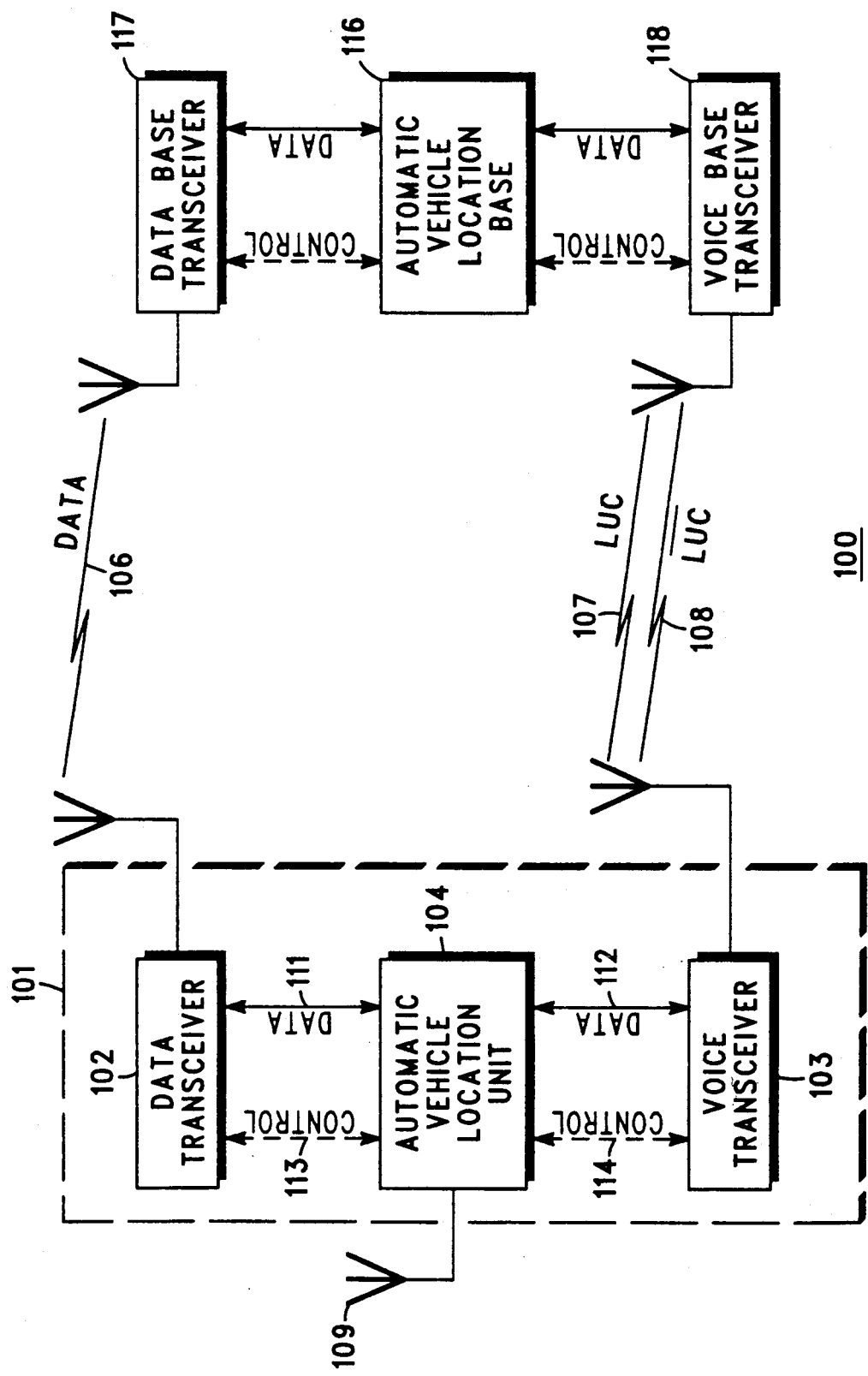
FIG. 1 comprises a block diagram depiction of an AVL system constructed in accordance with the invention.

A system employing the invention is depicted in FIG. 1 by the reference numeral 100. The system (100) includes an object to be monitored (101), such as a vehicle. Mounted within the vehicle (101) are a data transceiver (102), a voice transceiver (103), and an AVL unit (104). The data transceiver (102) functions to communicate data messages on a radio frequency data communications resource (106). The voice transceiver (103) functions to communicate voice messages (in conjunction with short data messages related to system status, resource grant protocols, and the like) on voice resources. Such voice resources may either be location update resources (LUC)(107) or non-location update resources (108). The nature and operability of an LUC resource (107) will be made more clear below.

The AVL unit (104) in this embodiment comprises a Loran C based location deriving unit, and therefore includes an appropriate antenna (109) to allow reception of Loran C signals. The AVL unit (104) includes at least one microprocessor, which microprocessor can communicate with both the data transceiver (102) and the voice transceiver (103) over an appropriate data line (111 and 112) and control line (113 and 114) (the control line is required only in the event that any of the transceivers or AVL unit are not capable of otherwise exchanging control information on the data lines (111 and 112).

Data transceivers, voice transceivers, and Loran C AVL units are readily available and well understood in the art. Therefore, no additional description regarding the constituent elements of these devices need be provided here.

The system (100) depicted also includes an AVL base site (116) that can exchange control and data information with both a base data transceiver (117) and a base voice transceiver (118). The former transceiver (117) can exchange data messages with the data transceiver (102) using the data communication resource (106), and the latter can communicate with the voice transceiver (103) using the voice communication resources (107 and 108), all as well understood in the art.

Figure 2:
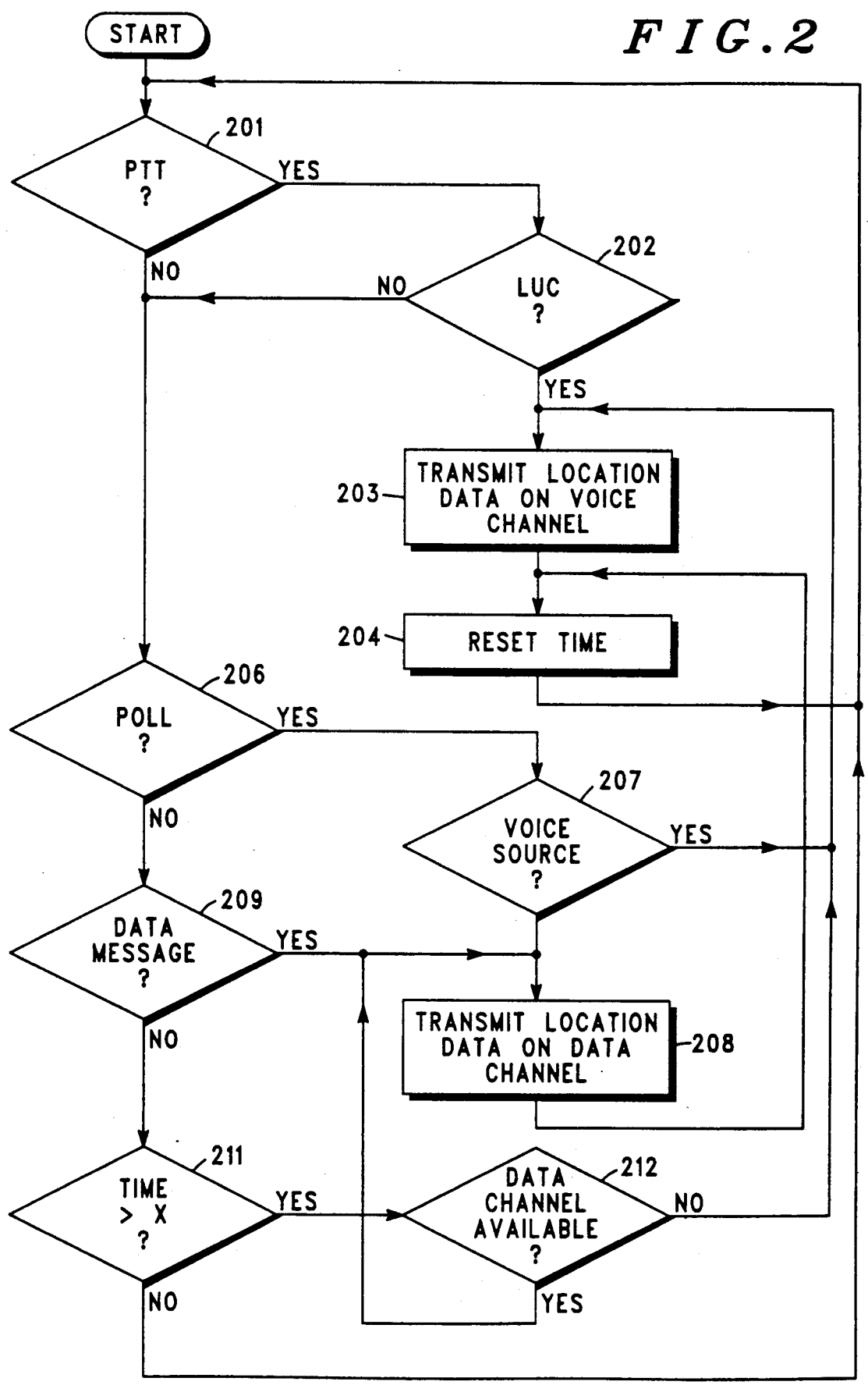
FIG. 2 comprises a flow diagram depicting operation of an AVL unit operating in accordance with the invention.

Operation of the AVL unit (104) in accordance with the invention can now be described by referring to the flow diagram depicted in FIG. 2.

Configured as depicted in FIG. 1, the AVL unit (104) can cause location messages to be transmitted to the AVL base (116) using either the data transceiver (102) or the voice transceiver (103). Generally, using both transceivers would not be appropriate, since this would require use of multiple communication resources, and hence would divert such resources from other uses. The AVL unit (104) is therefor programmed to select one of the transceivers (102 and 103) to transmit a location message in accordance with a number of predetermined criteria.

For example, if the vehicle operator asserts PTT as associated with the voice transceiver (201), the AVL unit (104) will determine whether the current voice communication resource (107 or 108) in use by the voice transceiver (103) comprises a location update resource (202). If the voice communication resource does constitute an LUC (107), the AVL unit (104) will cause location data to be transmitted on the voice resource (107) by the voice transceiver (203). Following this, the AVL unit (104) will reset an internal timer (204), the purpose of which will be made more clear below.

If, however, the voice resource does not constitute an LUC (202) the AVL unit (104) will not cause transmission of location information, and the voice message will occur without a postambled or preambled location message.

From time to time, the AVL base (116) will cause a polling message to be transmitted. Such a polling message, when received by an AVL unit, will cause the AVL unit to transmit its current location information. When such a polling request is received by the AVL unit (206), the AVL unit (104) will determine whether the polling request was received via the voice transceiver (207). If true, the AVL (104) will respond by causing the requested location data to be returned to the AVL base (116) via the voice transceiver (203). Otherwise, the AVL unit (104) will cause the data transceiver (102) to return the requested location information to the AVL base (208). Regardless of which transceiver the AVL unit (104) selects, the timer will again be reset (204).

If the user initiates a data message (209), the AVL unit will cause a location data message to be appended to the data message (208), and hence the data transceiver (102) will be utilized to transmit the location information.

Lastly, the AVL unit (104) will determine, from time to time, whether its internal timer, reflecting elapsed time since the last transmission of location information to the AVL base (116), exceeds a predetermined threshold X (211). X may be, for example, 15 minutes, 30 minutes, or another value as appropriate to a particular application. When such a period of time has elapsed, the AVL unit (104) will cause a location message to be transmitted to the AVL base (116). To effectuate this, the AVL unit (104) will first determine whether a data resource is available (212). If true, the AVL unit (104) will cause location information to be transmitted via the data communication resource. Otherwise, when a data communication resource is unavailable, the AVL unit (104) will cause the location information to be transmitted through use of the voice transceiver (103).

What is claimed is:

1. A location reporting device, for use with a voice resource communicating means operably coupled to the location reporting device for selectively communicating location of the device to a reporting site, and with a data resource communication means operably coupled to the location reporting device for selectively communicating the location of the device to a reporting site, such that both the voice resource communicating means and the data resource communicating means are able to communicate the location to the reporting site, the location reporting device comprising:

A) location determining means for determining at least an approximate geographic location of the device; and B) control means for automatically causing the location of the device to be communicated to the reporting site by only one of the voice resource communicating means and the data resource communicating means as a function of at least one predetermined criteria.

2. The location reporting device of claim 1 wherein the at least one predetermined criteria includes assertion of a push-to-talk command in association with the voice resource communicating means, wherein the control means responds thereto by automatically causing the location of the device to be communicated to the reporting site by only the voice resource communicating means.

3. The location reporting device of claim 2 wherein the at least one predetermined criteria further includes the location update resource status of a voice communication resource currently in use by the voice resource communicating means, and wherein the control means will automatically prevent the location of the device from being communicated to the reporting site by the voice resource communicating means in response to a push-to-talk assertion.

4. The location reporting device of claim 1 wherein the at least one predetermined criteria includes receiving a polling request from the reporting site, wherein the control means will automatically cause the location of the device to be communicated to the reporting site by which ever of the voice resource communicating means and data resource communicating means received the polling request.

5. The location reporting device of claim 1, wherein the at least one predetermined criteria includes elapsed time since a last provision of the location of the device to the reporting site, wherein the control means will respond thereto by automatically causing the location of the device to be communicated to the reporting site by only the data resource communicating means, unless the data resource communicating means is unable to communicate with the reporting site, in which event the control means will automatically cause the location of the device to be communicated to the reporting site by only the voice resource communicating means.

6. A location reporting device, for use with a voice resource communicating means operably coupled to the location reporting device for selectively communicating location of the device to a reporting site, and with a data resource communication means operably coupled to the location reporting device for selectively communicating the location of the device to a reporting site, the location reporting device comprising:
   A) location determining means for determining at least an approximate geographic location of the device; and
   B) control means for automatically causing the location of the device to be communicated to the reporting site by only one of the voice resource communicating means and the data resource communicating means as a function of at least one predetermined criteria, wherein the at least one predetermined criteria includes assertion of a push-to-talk command in association with the voice resource communicating means, wherein the control means responds thereto by automatically causing the location of the device to be communicated to the reporting site by only the voice resource communicating means.

7. The location reporting device of claim 6 wherein the at least one predetermined criteria further includes the location update resource status of a voice communication resource currently in use by the voice resource communicating means, and wherein the control means will automatically prevent the location of the device from being communicated to the reporting site by the voice resource communicating means in response to a push-to-talk assertion.

8. A location reporting device, for use with a voice resource communicating means operably coupled to the location reporting device for selectively communicating location of the device to a reporting site, and with a data resource communication means operably coupled to the location reporting device for selectively communicating the location of the device to a reporting site, the location reporting device comprising:
   A) location determining means for determining at least an approximate geographic location of the device; and
   B) control means for automatically causing the location of the device to be communicated to the reporting site by only one of the voice resource communicating means and the data resource communicating means as a function of at least one predetermined criteria, wherein the at least one predetermined criteria includes elapsed time since a last provision of the location of the device to the reporting site, wherein the control means will respond thereto by automatically causing the location of the device to be communicated to the reporting site by only the data resource communicating means, unless the data resource communicating means is unable to communicate with the reporting site, in which event the control means will automatically cause the location of the device to be communicated to the reporting site by only the voice resource communicating means.

* * * * *